United States Patent [19]

Calaway

[11] Patent Number: 4,790,711
[45] Date of Patent: Dec. 13, 1988

[54] SELF-LOADING AND UNLOADING TRUCK TRAILER ASSEMBLY

[76] Inventor: Timothy T. Calaway, 4812 E. Virginia Ave., Phoenix, Ariz. 85008-1623

[21] Appl. No.: 182,169

[22] Filed: Apr. 15, 1988

[51] Int. Cl.⁴ .............................................. B60P 1/00
[52] U.S. Cl. .................................. 414/635; 414/540; 180/324; 180/326; 180/327
[58] Field of Search ............... 180/321, 324, 326, 327, 180/329, 330, 331; 414/540, 670, 630, 631, 632, 634, 635, 636; 296/190

[56] References Cited

U.S. PATENT DOCUMENTS

| | | | |
|---|---|---|---|
| 2,980,269 | 4/1961 | Zimmerman | 214/75 |
| 3,254,900 | 6/1966 | Allen | 280/29 |
| 3,259,257 | 7/1966 | Brown et al. | 180/327 |
| 3,398,984 | 8/1968 | Ajero | 296/1 |
| 3,441,158 | 4/1969 | Wilson | 414/632 |
| 3,521,780 | 7/1970 | Cook | 414/631 |
| 3,595,409 | 7/1971 | Bowman-Shaw | 214/75 |
| 4,278,144 | 7/1981 | Perin | 180/329 |
| 4,630,700 | 12/1986 | Larsson | 296/190 |

FOREIGN PATENT DOCUMENTS 1022623  3/1966  United Kingdom ............... 180/329

Primary Examiner—Robert J. Spar
Assistant Examiner—Gary Cundiff
Attorney, Agent, or Firm—Warren F. B. Lindsley

[57] ABSTRACT

A self-loading and unloading truck trailer rig assembly wherein the cargo truck driver's cab comprises a split configuration mounted at one end of its chassis and a forklift mounted at the other end of the chassis. The mast of the forklift is pivotally mounted to the other end of the chassis and is arranged to lie on top of the chassis longitudinally thereof when the cargo truck is in transit on the highway and is movable to extend laterally of the chassis at its other end when the cargo truck is disconnected from its trailer and is serving as a forklift. When the cargo truck operates as a forklift, a part of its driver's cab is rotated 180 degrees to the rear of the chassis for operator control of the movement of the forklift and cargo truck.

7 Claims, 2 Drawing Sheets

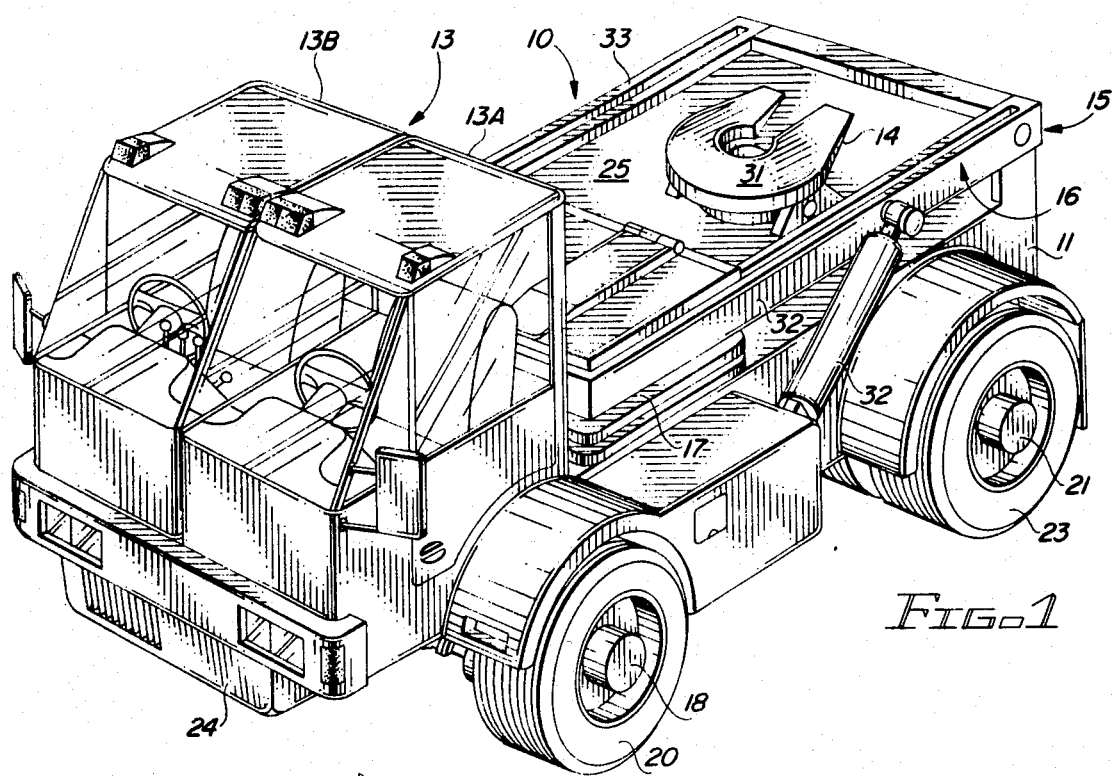
FIG-1
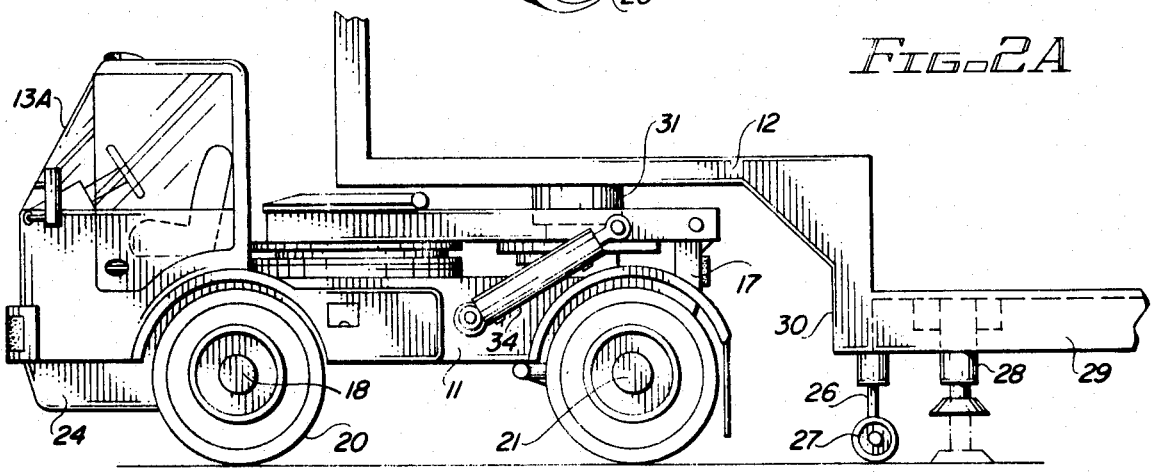
FIG-2A
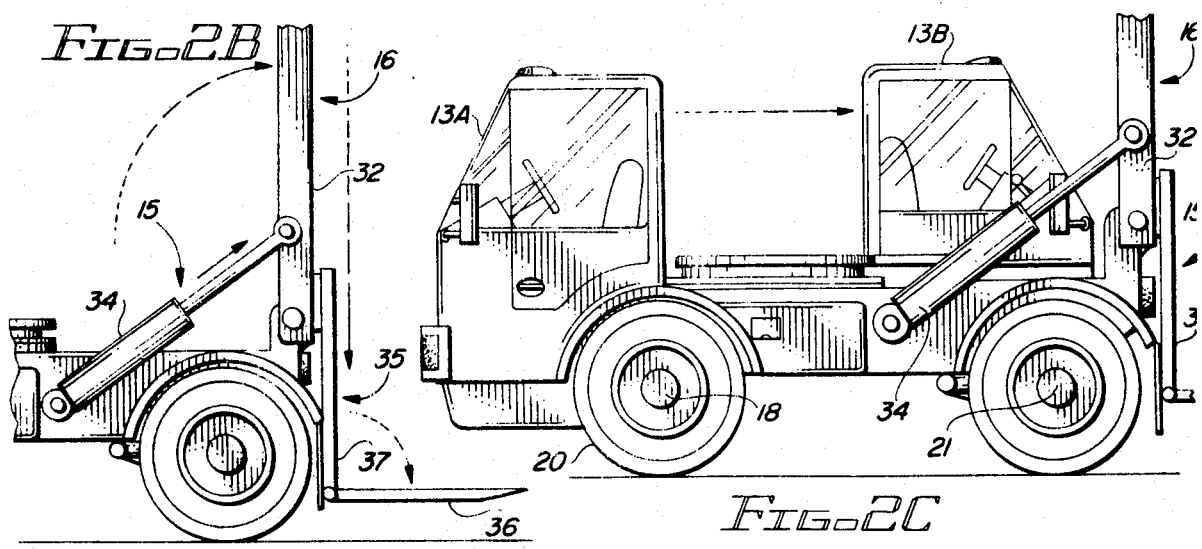
FIG-2B
FIG-2C

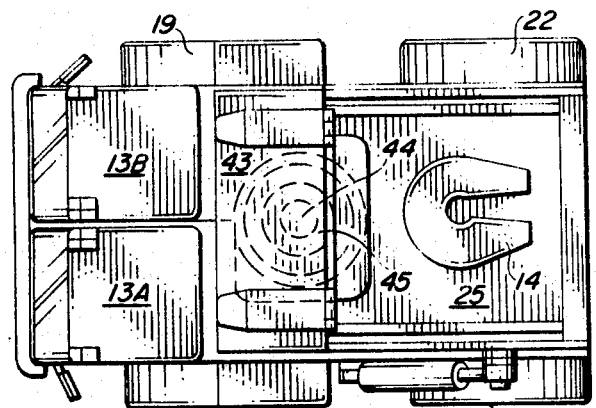
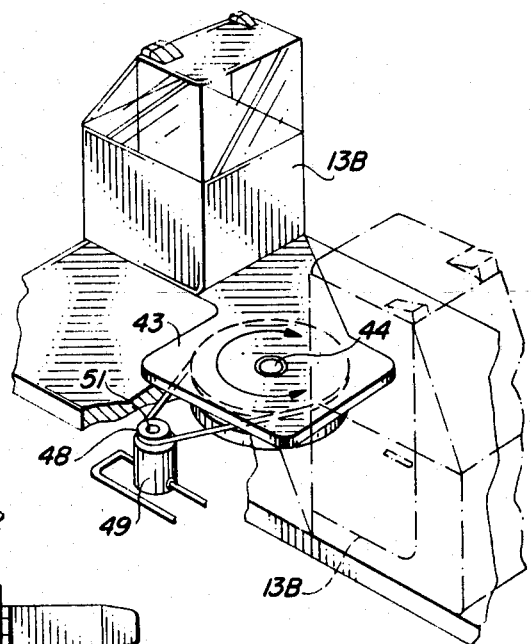
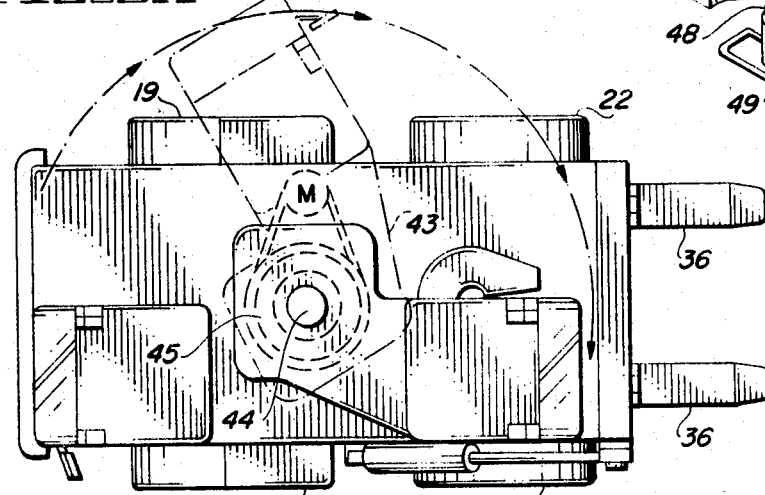
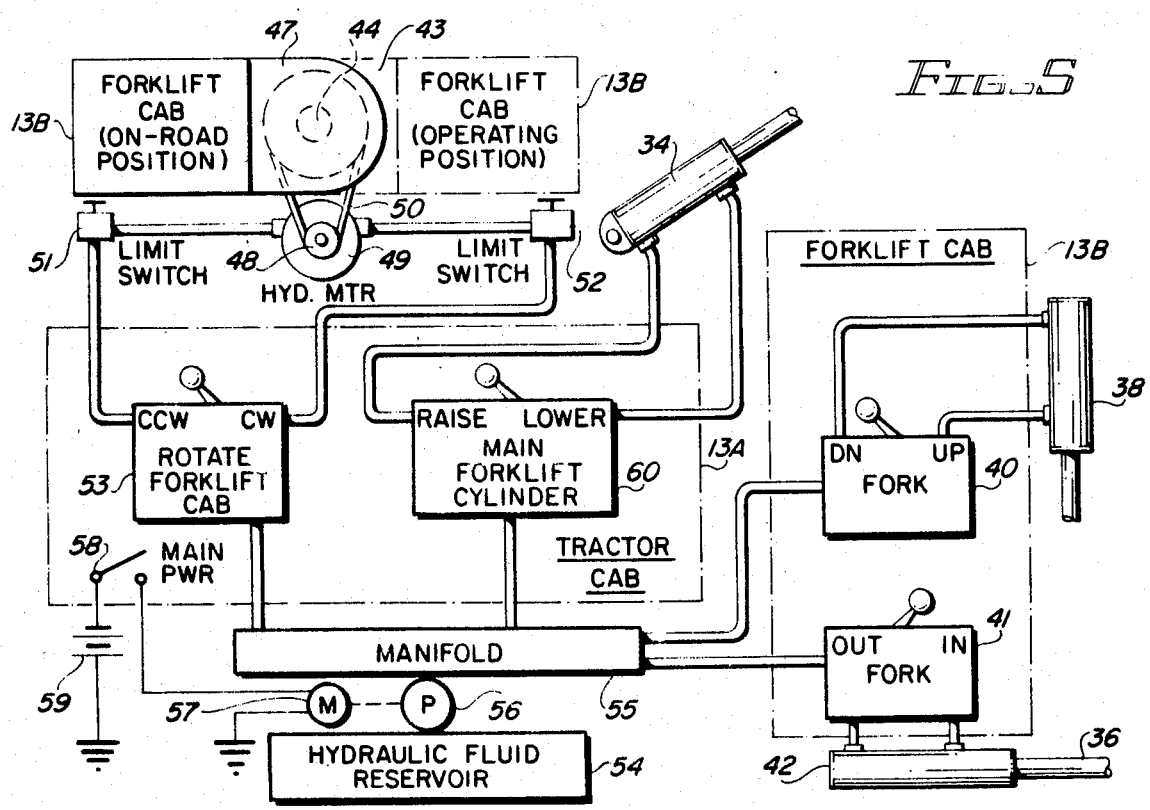

SELF-LOADING AND UNLOADING TRUCK TRAILER ASSEMBLY

BACKGROUND OF THE INVENTION

This invention relates to apparatus for moving material such as loaded pallets, and more particularly, to a dual purpose cargo truck and trailer arrangement of large load handling capacity having a forklift operable at the rear of the cargo truck by an operator's cab forming one-half of the cargo truck driver's cab which is rotatable to the back of the chassis of the cargo truck when needed for controlling the forklift.

In accordance with present practice, where movement of large quantities of relatively small articles is required, or when large items pallet mounted need to be removed from a truck bed, a forklift must be available at the unloading site. Many unloading sites do not have forklifts available and consequently, one must be carried or trailered by the cargo truck. If the forklift is bed mounted on the trailer, it reduces the cargo carrying space of the apparatus.

Thus, a need exists for a cargo truck chassis mounted forklift which is separate from the trailer of the truck assembly and wherein one-half of the driver's cab is selectively movable rearwardly on the truck chassis to position it for controlling the forklift operations at the rear of the chassis.

DESCRIPTION OF THE PRIOR ART

U.S. Pat. No. 2,980,269 discloses a truck chassis having a conveyor platform provided on its upper surface with a forklift assembly adjacent its front end with the capability of rotating its mast 180 degrees to cause it to overlie the conveyor platform.

U.S. Pat. No. 3,254,900 discloses a truck employing a cab which is movable relative to the truck chassis without affecting the steering position of the wheels of the truck.

U.S. Pat. No. 3,398,984 discloses a truck chassis carrying a flat cargo deck wherein the driver's seat and manual vehicle controls are mounted in the cab in the cab. The cab is swingable on a horizontal arc about the left front corner of the chassis selectively into a transit position in front of the deck and into a load transfer position at the left side of the deck.

U.S. Pat. No. 3,595,409 discloses a side loader vehicle comprising front and rear body portions supported on front and rear road wheels and interconnected by a backbone along one side of the vehicle. A recess is provided in the opposite side of the vehicle extending substantially to the backbone with a fork mast load lifting assembly mounted for power operated movement in the recess.

None of the known prior art disclose a cargo truck which, when separated from its semitrailer, can function to load and unload its trailer as well as function as a forklift for other work requirements.

SUMMARY OF THE INVENTION

In accordance with the invention claimed, a new and improved self-loading and unloading truck trailer rig assembly is provided, the cargo truck of which serves both as a vehicle prime mover as well as a forklift vehicle with minor automatic adjustments.

It is, therefore, one object of this invention to provide a new and improved vehicle prime mover which carries the mast of a chassis mounted forklift in a horizontal position longitudinally of its chassis when trailer hauling, and which may be vertically positioned when disconnected from the associated trailer.

Another object of this invention is to provide such a prime mover with a driver's cab substantially one-half of which may be rotated to the rear of its chassis for operator control of the forklift at the rear of the chassis.

A further object of this invention is to provide a new and improved prime mover substantially one-half of the driver's cab of which may be rotated 180 degrees to the rear of its chassis for steering and movement control of a forklift at the rear of the chassis.

A still further object of this invention is to provide an improved motor vehicle wherein a part of the driver's cab is movably arranged with respect to the vehicle chassis, wherein a part of its cab may operate the prime mover from either end of its chassis.

Further objects and advantages of this invention will become apparent as the following description proceeds, and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of a cargo truck embodying the invention;

FIG. 2A is a side view of the cargo truck shown in FIG. 1 with a partial view of a semitrailer elevated for disconnection from the fifth wheel of the cargo truck;

FIG. 2B is a partial side view of the rear of the chassis of the cargo truck shown in FIG. 1 with the mast of the truck lift in its elevated substantially vertical position;

FIG. 2C is a side view of the cargo truck shown in FIG. 1 with the mast of the forklift in its substantially vertical position and a part of the cab of the truck rotated to face outwardly of the rear of the truck chassis for operation of the forklift and selective control of the movement of the truck;

FIG. 3A is a top view of the cargo truck shown in FIG. 1;

FIG. 3B is a view similar to FIG. 3A with a part of the driver's cab shown in dash lines being rotated to the rear of the truck chassis and facing outwardly thereof;

FIG. 4 is a partial view of the cargo truck assembly showing the cab rotating mechanism; and FIG. 5 is a block diagram illustrating the operating parts of the cargo truck forklift assembly.

DESCRIPTION OF THE PREFERRED EMBODIMENT

Referring more particularly to the drawings by characters of reference, FIGS. 1–5 disclose a new and improved self-loading and unloading truck trailer rig assembly 10 comprising a prime mover, such as cargo truck 11 and an associated semitrailer 12.

The cargo truck 11 comprises a driver's cab 13 split substantially in half to form a cargo truck cab portion 13A and a rotatable forklift operator's cab portion 13B. An adjustable connecting means 14 is provided for selectively connecting and disconnecting semitrailer 12 to the cargo truck 11. As will be explained more fully below, the connecting means 14 comprising the known fifth wheel connection which is selectively operable to connect and disconnect the semitrailer from the cargo truck, and when so disconnected renders the cargo truck operable to function as a forklift vehicle.

When the driver's cab 13 and its two portions 13A and 13B occupy its forward position, as shown in FIG. 1, the driver in cab portion 13A will be suitably positioned to operate the vehicle including the cargo truck and semitrailer in transit, as on a highway. On the other hand, when portion 13B of the driver's cab is in the dash line position, shown in FIG. 4, it occupies a rearward position for controlling a forklift 15, the mast 16, of which lies horizontally on and longitudinal of chassis 17 of cargo truck 11 when assembly 10 is functioning as a prime mover, and is elevated or tilted to a substantially vertical position on chassis 17 prior to the rotation of cab portion 13B to the rear of the chassis when cargo truck 11 is operating as a forklift vehicle.

The vehicle body comprises, in addition to chassis 17, a front axle 18 mounting steerable front wheels 19 and 20 and a rear axle 21 mounting dual tire propelling rear wheels 22 and 23. A power plant, including an internal combustion engine 24 and a change speed transmission and direct mounted heavy duty hydraulic pump (not shown) are suitably mounted on the chassis with conventional power transmission mechanism (not shown) connecting the transmission in driving relation with the rear wheels 22 and 23.

The semitrailer 12 is provided with the usual extensible wheel assembly 26, including a wheel 27 which is lowered to the ground to support the front end of the semitrailer when it is detached from the cargo truck. The front end of the semitrailer may be elevated sufficiently by means of a jack 28 mounted underneath the chassis 29 at the front 30 of the semitrailer. This jack may be operated hydraulically by the operator of the rig assembly 10 in or on the cargo truck to lift a kingpin (not shown) of the semitrailer out of a fifth wheel assembly 31 mounted on the chassis of the cargo truck 11 in a conventional manner.

In accordance with the invention claimed, a forklift 15 is mounted on the rear of chassis 17 of the cargo truck 10 with its mast 16 comprising the usual rectangular shaped configurations forming rails 32 and 33 which are pivotally mounted one to each side of the rear of chassis 17 for movement from a horizontal position lying on top of chassis 17 to a substantially vertical position by a hydraulic means 34, shown in FIGS. 2B and 2C. This assembly includes a fork or similar load engaging member which is capable of being raised, lowered and shifted inwardly and outwardly about the vertical axis of forklift 15 in a conventional manner.

The conventional forklift 15 comprises a pair of relatively flat horizontally disposed tines 36. Each of the tines is provided with a vertically positioned extension 37 which is secured to cross bars, not shown, of mast 16. These bars are provided with rollers engagable in tracks disposed along each side of rails 32 and 33 in the manner shown in U.S. Pat. No. 2,980,269 and included herein by reference.

By means of the roller connection, forklift 15 is capable of vertical movement on rails 32 and 33 and any suitable mechanism such as hydraulic means 38, shown in FIG. 5, may be utilized for effecting the conventional raising and lowering of the fork on the relatively stationary rails or arms 32 and 33.

As described in broad terms, mast 16 of forklift 15 is stored when cargo truck is normally traveling along highways and the like, and when the semitrailer of the rig assembly is disconnected from the cargo truck, mast 16 is elevated or tilted through 90 degrees from the position illustrated in FIG. 1 of the drawings to that illustrated in FIGS. 2B and 2C for forklift activities and then returned to its normal position illustrated in FIG. 1, and the semitrailer then again reconnected to the cargo truck through utilization of the fifth wheel assembly in the conventional manner.

In accordance with the invention claimed, a part of the divided driver's cab 13 comprises portion 13B which is movable from the right side of the cargo truck as shown in FIG. 1 through 180 degrees to the position shown in FIG. 2C for operating forklift 15.

The reason for relocating this portion of the cab and drive mechanism is to permit the driver of the forklift to face his load and place him in the position of a driver of a conventional forklift vehicle.

As shown in FIG. 5, cab portion 13B of the forklift is provided with a pair of controls 40 and 41 which control the movement of forklift 15 up and down mast 16 in a conventional manner by hydraulic means 38 and also controls the movement of tines 36 laterally inwardly and outwardly of vertical extension 37 of forklift 15 by hydraulic means 42.

Cab portion 13B is mounted on top of an arm 43 that is pivotally mounted on chassis 17 for limited movement about a vertically positioned pin 44. Roller bearings, not shown, are mounted within a sleeve 45 fitted around pin 44 which is secured to arm 43 by welding so that arm 43 extends laterally therefrom.

FIGS. 3A, 3B, 4 and 5 illustrate, for example, one form of a reversible power transmitting mechanism for effecting arcuate translatory back and forth movement of cab portion 13B between its transit and cargo transfer positions. This form of mechanism comprises a pair of sprocket wheels 47 and 48 for rotation of arm 43 about pin 44 with wheel 48 being fixedly attached to a drive shaft of a hydraulic motor 49. An endless chain 50 is trained about the sprocket wheels.

The hydraulic motor 49 comprises a cylinder and a double acting ram, i.e., its piston rod may be forced by fluid pressure back and forth between retracted and extended positions controlled by limit switches 51 and 52 which are engaged in the two controlled positions by control switch 53 in cab portion 13B of the cargo truck.

FIG. 5 illustrates in diagrammatic form the electrical and hydraulic system operating rig assembly 10. As shown, the hydraulic system comprises a reservoir 54, the hydraulic fluid of which is moved under pressure into a manifold 55 by a suitable pump 56 which is actuated by an electric motor 57 energized through an on-off switch 58 by a suitable battery 59.

As shown in FIG. 5, the operator of the cargo truck in cab portion 13A may actuate main forklift cylinder 34 by use of control switch 60 to raise or lower mast 16 of forklift 15 from its storage position shown in FIG. 1. At this point in time, cab portion 13B may be rotated from its transit position shown in FIG. 1 to its forklift control position shown in FIG. 2C by use of control switch 53 which may be located in cab portion 13A or at some point along the side of the cargo truck outside of the cab.

Since both cab portions 13A and 13B are intended to have dual controls for operating the cargo truck, when cab portion 13B has been rotated to its forklift control position, as shown in FIG. 2C, the operator of the forklift may move the cargo truck in any direction he chooses in the same manner as the operator of a forklift controls his vehicle.

Thus, in accordance with the teaching of this invention, a cargo truck may be readily converted from a transit cargo hauler to a forklift with a minimum of conversion parts.

An improved self-loading and unloading truck trailer rig assembly is thus provided in accordance with the stated objects of the invention, and although but one embodiment of the invention has been illustrated and described, it will be apparent to those skilled in the art that various changes and modifications may be made therein without departing from the spirit of the invention or from the scope of the appended claims.

What is claimed is:

1. A motor vehicle comprising:
   a wheeled chassis,
   a dual purpose operator's cab comprising a fixed first operator's portion including controls for operating the motor vehicle and a movable second operator's portion both located at one end of said chassis,
   a forklift assembly mounted at the other end of said chassis,
   said forklift assembly comprising a mast and a forklift for controlled movement along said mast,
   said mast being pivotally mounted at said other end of said chassis for movement about a horizontal axis from a position lying in a horizontal orientation on top of said chassis and extending longitudinally thereof to a vertically extending position located laterally of said other end of said chassis,
   a first means mounted on said chassis for pivoting said mast from said horizontally extending position to its vertically extending position and vice versa,
   horizontally extending and vertically rigid supporting and turning means mounting said second portion of said cab on said chassis for moving said second portion of said cab about a vertical axis located intermediate the length of said chassis for selective adjustment of said second portion of said cab either into a transit position at said one end of said chassis or into a cargo transfer position at said other end of said chassis,
   a reversible power transmitting means selectively operatively associated with said supporting and turning means so that actuation of said supporting and turning means by said power transmitting means in one direction will move said second portion of said cab from said transit to said cargo transfer position and in another direction will return said second portion of said cab to said transit position, and
   said second portion of said cab including controls for selectively operating said forklift and said motor vehicle for cargo moving activity when said second portion of said cab is in said cargo transfer position.

2. The motor vehicle set forth in claim 1 wherein:
   said reversible power transmitting means is sequentially operable after actuation of said firs means.

3. The motor vehicle set forth in claim 1 wherein:
   said controls in said second portion of said cab permit independently operating the vehicle from said other end of said chassis in a transitory mode and said forklift in a cargo transfer mode.

4. The motor vehicle set forth in claim 1 wherein:
   said reversible power transmitting means comprises hydraulically operated apparatus.

5. The motor vehicle set forth in claim 1 in further combination with:
   limit switches for controlling the operation of said reversible power transmitting means in said one direction and in said other direction.

6. The motor vehicle set forth in claim 1 wherein:
   said reversible power transmitting means when operatively associated with said supporting and turning means during movement of said second portion of said cab in said one direction from said transit to said cargo transfer position rotating said second portion of said cab substantially 180 degrees and when moving said second portion of said cab back to said transit position, moving said second portion of said cab back through the same 180 degrees.

7. The motor vehicle set forth in claim 1:
   wherein said controls in each of the first and second portions of said cab for operating the motor vehicle from each end of the chassis are duplicate controls.

* * * * *

UNITED STATES PATENT OFFICE
CERTIFICATE OF CORRECTION

Patent No. 4,790,711　　　　　Dated December 13, 1988

Inventor(s) Timothy T. Calaway

It is certified that error appears in the above-identified patent and that said Letters Patent is hereby corrected as shown below:

Claim 2, line 3, cancel "firs" and substitute

---first---.

Signed and Sealed this

Twenty-third Day of May, 1989

Attest:

DONALD J. QUIGG

Attesting Officer　　　Commissioner of Patents and Trademarks